United States Patent [19]
Hochstetter

[11] 4,147,972
[45] Apr. 3, 1979

[54] CONTROL CIRCUIT FOR AN A-C CONTROL ELEMENT

[75] Inventor: Werner Hochstetter, Erlangen, Fed. Rep. of Germany

[73] Assignee: Siemens Aktiengesellschaft, Munich, Fed. Rep. of Germany

[21] Appl. No.: 813,287

[22] Filed: Jul. 6, 1977

[30] Foreign Application Priority Data

Jul. 22, 1976 [DE] Fed. Rep. of Germany ....... 2633071

[51] Int. Cl.² .............................................. G05F 1/20
[52] U.S. Cl. ...................................... 323/24; 323/39; 307/252 T
[58] Field of Search .......... 323/6, 20, 24, 17, DIG. 1, 323/34-39; 307/252 N, 252 T

[56] References Cited
U.S. PATENT DOCUMENTS

| | | | |
|---|---|---|---|
| 3,663,949 | 5/1972 | Froeschle | 323/DIG. 1 |
| 3,790,878 | 2/1974 | Brokaw | 323/20 |
| 3,906,337 | 9/1975 | Depenbrock | 323/24 |

*Primary Examiner*—Gerald Goldberg
*Attorney, Agent, or Firm*—Kenyon & Kenyon, Reilly, Carr & Chapin

[57] ABSTRACT

A control circuit for an a-c control element consisting of controlled rectifier elements in conjunction with a transformer in which a separate current transformer is provided for each of the transformer windings and all current transformers of the same respective phase have their secondaries connected together in a bucking circuit, to which a measuring arrangement is connected which measures the peak value of the difference value formed during each half-wave, and the output signal of which is introduced, depending on the polarity of the difference value, into the control circuit of the one or the other branch of the a-c control element.

3 Claims, 1 Drawing Figure

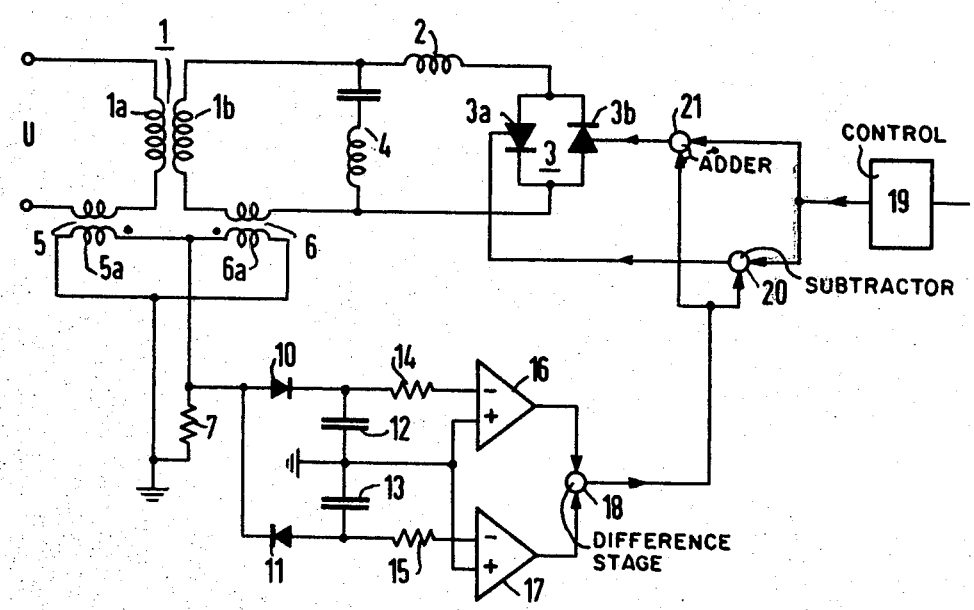

CONTROL CIRCUIT FOR AN A-C CONTROL ELEMENT

BACKGROUND OF THE INVENTION

This invention relates to control circuits for a-c control elements in general and more particularly, to an improved control circuit for an a-c control element which consists of controlled rectifier elements and is connected to a transformer.

In an a-c control element, the current is controlled by appropriately delaying the flow of the current at the beginning of each half-wave. If the firing angles of the positive and negative half-waves do not agree exactly, than a d-c component is generated in the current. If the a-c control element is connected to a transformer, then the d-c component caused by unequal firing angles drives the preceding transformer unilaterally into saturation. This causes large magnetizing currents to flow, which increase the no-load losses of the transformer considerably.

Up to now, attempts have been made to prevent the generation of a d-c component through a very high angular accuracy of the control unit controlling the a-c control element. Such control units require a correspondingly large expenditure of money.

SUMMARY OF THE INVENTION

It is an object of the present invention to provide a control circuit for an a-c control element, by which the creation of a harmful d-c component in a circuit controlled by an a-c control element is avoided.

According to the present invention, the solution of the stated problem becomes possible by providing a plurality of current transformers, one for each winding of the transformer and by connecting the secondary windings of all the current transformers connected to the same phase together in a bucking connection, by coupling to this bucking connection a measuring arrangement which measures the peak value of the difference value formed therein during each half-wave, and by introducing the output signal of the measuring arrangement into one or the other arm of the control circuit of the a-c control element, depending on its polarity. With such a control circuit, the firing angle of the individual rectifier elements of the a-c control element is shifted so that, for the positive and negative half-waves, a current conduction period which results in no harmful d-c component is always obtained.

According to one embodiment of the present invention, a particularly simple control circuit is obtained by using a measuring arrangement comprising two capacitors which are connected to the bucking connection via oppositely poled diodes and with each capacitor havings its terminals coupled across the inverting and non-inverting inputs of a respective operational amplifier. The outputs of the operational amplifier are connected as inputs to a difference stage, the output of which is coupled to the control circuits of the rectifier elements arranged in the two arms of the a-c control element. Opposite shifting of the firing instants of the rectifier elements of the a-c control element is advantageously made possible by providing that the output of the difference stage is coupled to one input of an adding stage arranged in the control circuit of the one rectifier element, and to one input of a subtraction stage arranged in the control circuit of the other rectifier element.

BRIEF DESCRIPTION OF THE DRAWING

The single FIGURE illustrates an embodiment of the present invention for a single phase.

DETAILED DESCRIPTION OF THE INVENTION

A transformer 1 having its primary side 1a connected to a line voltage U is shown. A load 2 in series with an a-c control element 3 is connected to the secondary side 1b of transformer 1. A filter 4 for the suppression of harmonics is also coupled to the secondary side 1b. A first current transformer 5 is connected in series with the primary side 1a of the transformer 1. Likewise, a second current transformer 6 is arranged on the secondary side 1b in such a manner that the current in the load 2 and the filter 4 flows through it. In other words, there is a current transformer for each transformer winding. In a three phase transformer, each winding would also have a current transformer resulting in a total of six current transformers. The secondary winding 5a of the current transformer 5 and the secondary winding 6a of the current transformer 6 are connected together in opposition, i.e., bucking each other. In the middle branch of this difference circuit, an ohmic resistor 7 is arranged. Because the secondary windings 5a and 6a buck each other, only a current proportional to the magnetizing current of the transformer flows through the ohmic resistor 7.

Two capacitors 12 and 13 each have one terminal coupled to the one lead of the ohmic resistor 7, via two oppositely poled diodes 10 and 11.

The other terminals of capacitors 12 and 13 are connected to the grounded side of the ohmic resistor 7. The terminals of the respective capacitors 12 and 13 which are connected to the diodes 10 and 11, respectively, are connected via input resistors 14 and 15 to the inverting inputs of operational amplifiers 16 and 17 respectively. The non-inverting inputs of the operational amplifiers 16 and 17 are at ground potential. The respective outputs of the two operational amplifiers 16 and 17 are brought to a difference stage 18, e.g., a differencing amplifier. The output signal of the difference stage 18 is introduced into the control circuits of the a-c control element 3.

The a-c control element 3 contains two anti-parallel connected thyristors 3a and 3b as rectifier elements. The thyristors 3a and 3b receive their firing signals from a control unit 19. In the control unit provided between the control unit 19 and the thyristor 3a, a subtraction stage 20 is inserted and into the control circuit provided between the thyristor 3b and the control unit 19, an adding stage 21 is inserted. The corresponding control signal of the control unit 19 is fed to the one input of the subtraction stage 20 and to one input of the adding stage 21. The output signal of the difference stage 18 is fed to the other inputs of the subtraction stage 20 and the adding stage 21, respectively.

If a d-c component appears due to unequal control of the two thyristors 3a and 3b, this leads to unilateral saturation of the transformer. Because of the unilateral saturation, the magnetizing current becomes asymmetrical and has a pronounced peak in the one half-wave. Through the difference connection of the secondary winding 5a and 6a of the current transformers 5 and 6, such peaks of the magnetizing current are detected. Depending on the polarity of the peak, the capacitor 12 or 13 is charged via its diode 10 or 11, respectively, to the value of the peak of the magnetizing current. The output signals of the operational amplifiers 16 and 17 always corresponds to the voltage present at their respective capacitors 12 or 13. In the difference stage 18, the difference of the output signals of the two operational amplifiers is formed. The output signal of the difference stage is therefore a measure for the asymmetry of the magnetizing current.

The output signal of the difference stage 18 is introduced via the subtraction stage 20 and the adding stage 21 into the control circuits of the thyristors 3a and 3b.

The introduction via a subtraction stage into the one control circuit and via an adding stage into the other control circuit results in an opposite shift of the firing instants in the two control circuits. Whether, for instance, the firing instant for the thyristor 3a is advanced or retarded, depends again on the polarity of the output signal of the difference stage 18. The firing instant of the two thyristors is always shifted far enough that no harmful d-c component occurs.

The control circuit described is also suited for transformers with tertiary windings. As with the primary and secondary windings, a current transformer is connected in series with the tertiary winding in each phase. The current transformers connected in series with the secondary and tertiary windings are connected together with the current transformers associated with the primary winding in a bucking connection, so that the magnetizing current can again be taken off from this connection.

For multiphase transformers, a control circuit according to the FIGURE must be provided for each phase.

It should further be mentioned that with different types of connection of the transformer and the connected load, for instance, with the transformer Y-connected and the load Δ-connected, a selection circuit is necessary, through which the output signal of the difference stage 18 is connected to the individual control circuits with the correct phase.

I claim:

1. A control circuit for an a-c control element supplied by at least one phase which includes controlled rectifier elements in a two arm arrangement connected to a first transformer having at least a primary and a secondary winding comprising:
   (a) a plurality of current transformers, equal in number to the total number of windings in said first transformer, said plurality of current transformers each having its primary winding in series with one of said windings of said first transformer, and the secondary windings of all of said plurality of current transformers which are connected to the same phase tied together in a bucking connection to provide a difference signal output;
   (b) a measuring arrangement for measuring the peak value of said difference signal during each positive and negative half-wave having its input coupled thereto, and providing an output signal which is the difference between the positive and negative peaks; and
   (c) means for coupling said output signal to the control circuit of the one or the other arm of the a-c control element, depending on the polarity of said output signal.

2. A control circuit according to claim 1, wherein said measuring arrangement comprises:
   (a) first and second capacitors;
   (b) first and second oppositely poled diodes coupling one terminal of said first and second capacitors, respectively, to the difference signal output;
   (c) first and second operational amplifiers having said respective first and second capacitors coupled across their inverting and non-inverting inputs; and
   (d) a difference stage having the outputs of said operational amplifiers as inputs, the output of said difference stage coupled through said coupling means to the control circuits of the rectifier elements arranged in the two arms of the a-c control element.

3. A control circuit according to claim 2 wherein said coupling means comprise:
   (a) an adding stage arranged in the control circuit of the one rectifier element; and
   (b) a subtraction stage arranged in the control circuit of the other rectifier element, both having as one input the output of said difference stage.

* * * * *